United States Patent [19]

Tzeng

[11] Patent Number: 4,887,895

[45] Date of Patent: Dec. 19, 1989

[54] FOLDING GLASSES

[76] Inventor: Ming-Her Tzeng, No. 106, Kang-Dong Village, Hsi-Kang Shiang, Tainan Hsien, Taiwan

[21] Appl. No.: 305,089

[22] Filed: Feb. 2, 1989

[51] Int. Cl.[4] .......................... G02C 5/08; G02C 7/10; G02C 11/02
[52] U.S. Cl. ........................................ 351/63; 351/44; 351/51
[58] Field of Search ....................... 351/63, 44, 57, 58, 351/59, 47, 48, 51, 52; 2/13, 14

[56] References Cited

U.S. PATENT DOCUMENTS 2,275,999  3/1942  Strauss .................................. 351/63

Primary Examiner—Rodney B. Bovernick
Attorney, Agent, or Firm—Bacon & Thomas

[57] ABSTRACT

This invention relates to a folding glasses which is provided with a pair of lens covers adapted to be swung between a horizontal position for shading glare light and a dependent position for protecting lenses thereof, and is adapted to be folded into a decorative shape of a beetle or the like.

4 Claims, 5 Drawing Sheets

FOLDING GLASSES

BACKGROUND OF THE INVENTION

This invention relates to a glasses, and particularly to a folding glasses.

Conventionally, a sunglasses comprises an eyecovering section or sun screen adapted to be swung optional into, or out of, the line of vision of the wearer as disclosed by U.S. Pat. No. 2,998,610. It is found inconvenient in bringing. Several types of folding glasses are available at the present time. Yet they work without decorative and lenses-protecting functions. To this end, the inventor has attempted to make an improved folding glasses to overcome the drawbacks of the known glasses.

SUMMARY OF THE INVENTION

An object of this invention is to provide a folding glasses which can diminish the disadvantages of the known glasses.

It is another object of this invention to provide a folding glasses with a construction allowing the glasses to be folded in a shape with decorative function.

It is yet another object of this invention to provide a folding glasses with a pair of lenses shaded by a pair of covers as in wearing condition and protected by the covers as in folded condition.

With the above object in view, this invention provides a folding glasses which comprises a head engaging frame member having a pair of swingable spaced lenses joined by means of a bridge member and two temples having swingable terminal sections, being hingedly attached to the lenses, and a pair of lens covers hingedly attached to the lenses via a pair of supporting bracket units, and swingable between a first horizontal position for shading the lenses and a second dependent position for protecting the lenses.

DETAILED DESCRIPTION OF THE PREFERRED EMBODIMENT

The following is a detailed description of the best presently contemplated embodiment of the invention. This description is not to be taken in a limiting sense, but is made merely for the purpose of illustrating the general principles of the invention.

Figure 1:
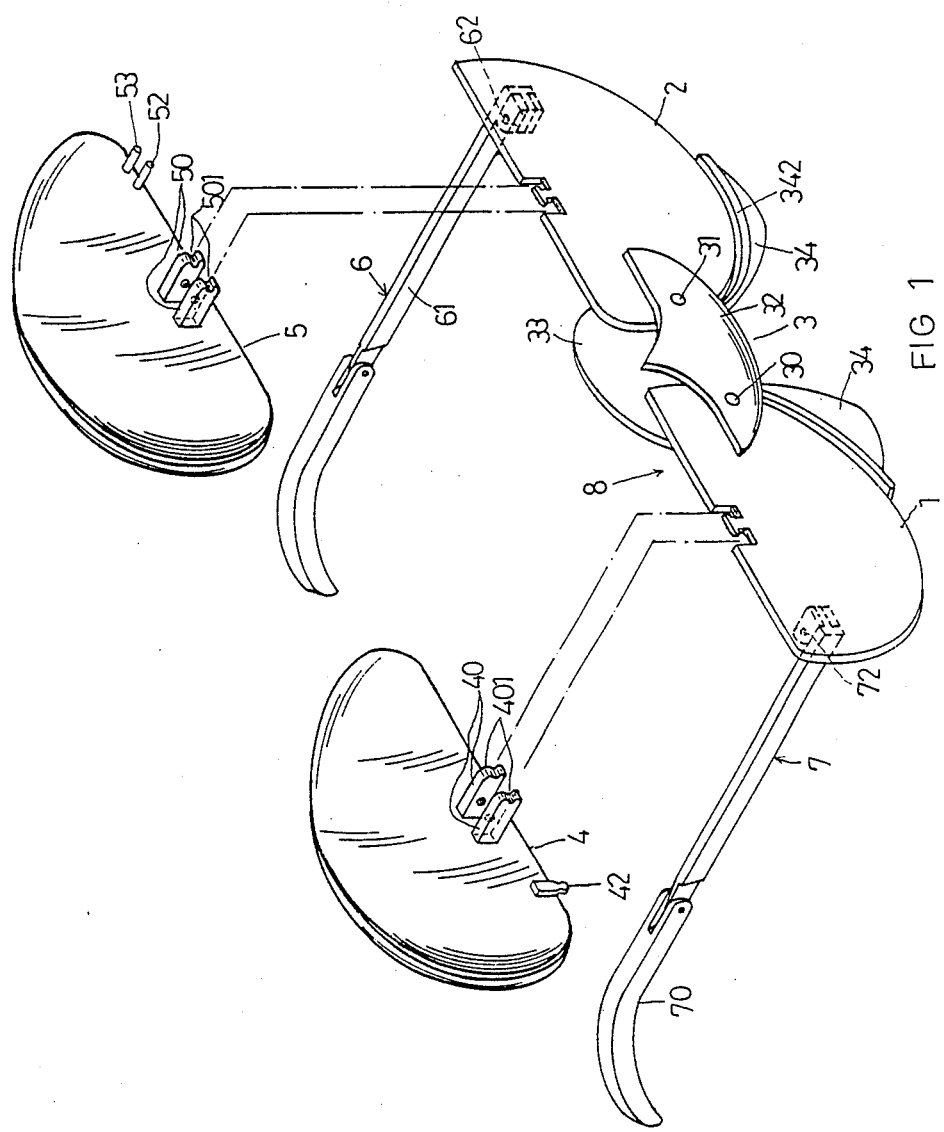
FIG. 1 is a perspective view of a preferred embodiment of a folding glasses according to this invention with lens covers in removed condition.
Figure 2:
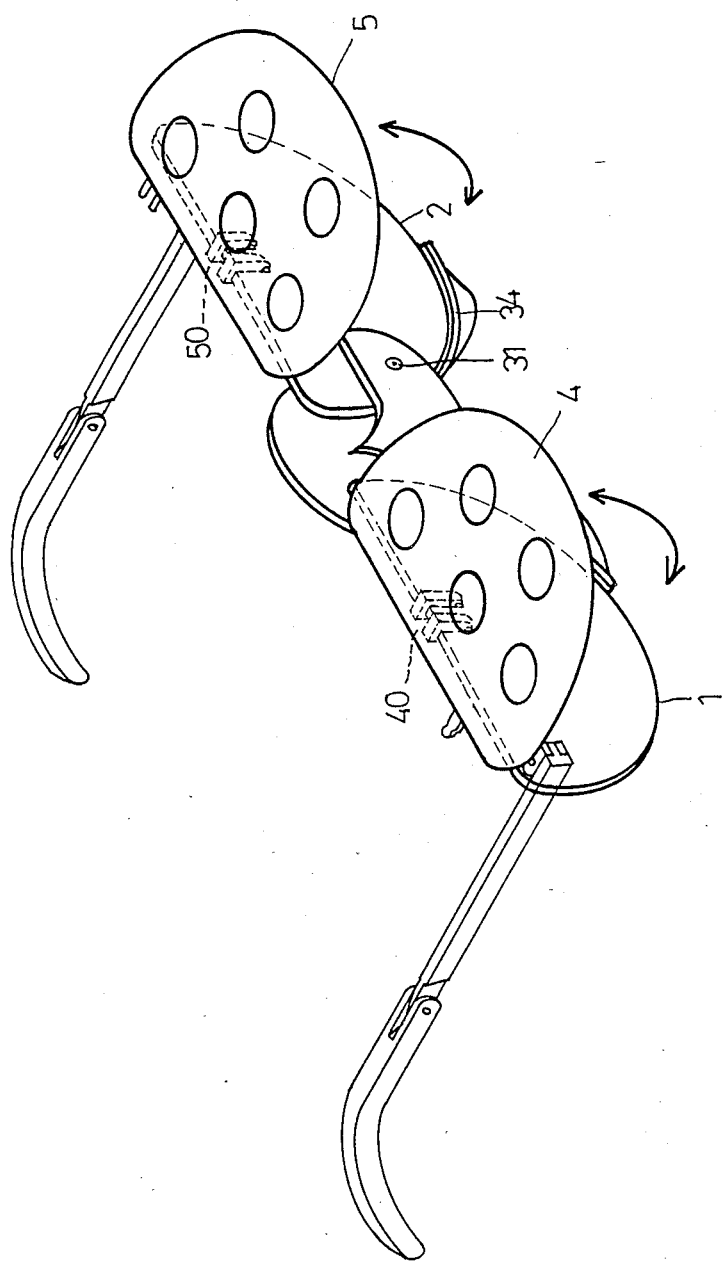
FIG. 2 is a perspective view of the glasses shown in FIG. 1 with the lens covers in a first horizontal position.
Figure 3:
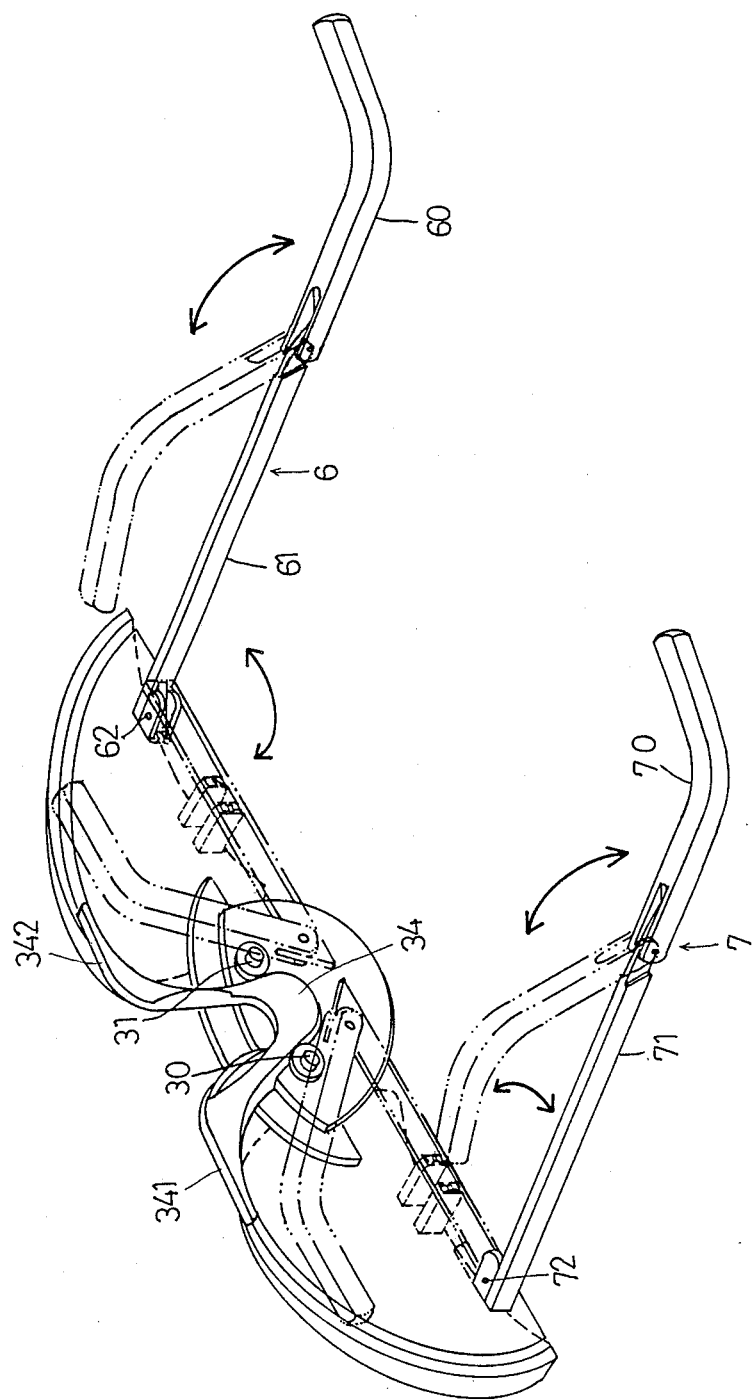
FIG. 3 is a perspective view of the glasses which is positioned upside-down.

As shown in FIGS. 1, 2 and 3, broadly speaking, the folding glasses according to this invention comprises a head engaging frame member 8 having a pair of spaced lenses 1, 2, a pair of lens covers 4, 6 preferably made of obscure material and printed with a plurality of circular patterns thereon, and being substantially corresponding in shapes to that of the lenses 1, 2, respectively and hingedly attached thereto via a pair of supporting bracket units 40, 50, and swingable between a first horizontal position for shading glare light wherein the lens covers 4, 5 are out of the line of vision of the wearer, and a second dependent position as to be folded.

Figure 4:
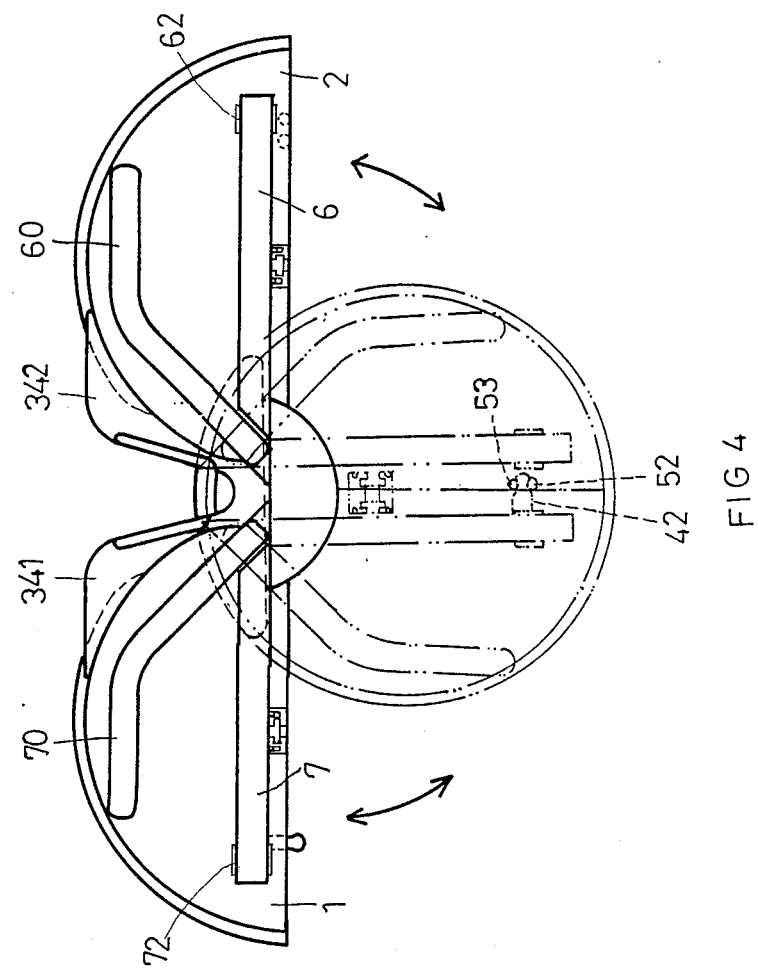
FIG. 4 is a front elevational view of the glasses with its temples in a folded position.
Figure 5:
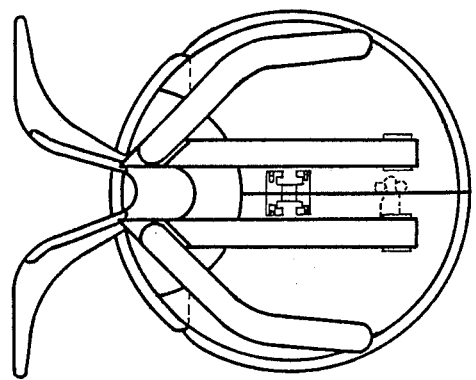
FIG. 5 is a bottom plan view of the glasses in a folded condition.
Figure 6:
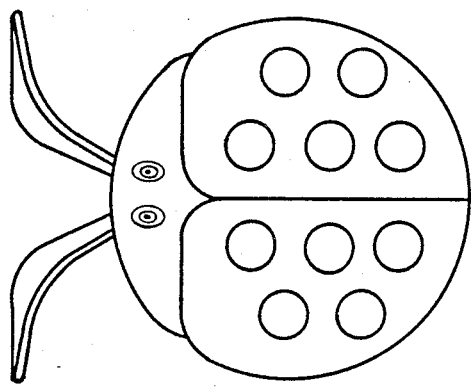
FIG. 6 is a top plan view of the glasses shown in FIG. 5.

The frame member 8 comprises a bridge member generally indicated at 3 including a frontal plate 32 and an opposed rear plate 33 which sandwiches the inner portions of the spaced lenses 1, 2 and at least two studs 30, 31 spacedly penetrated through the stacked portions of the frontal plate 31, the lenses 1, 2 and the rear plate 33. The lenses thus joined are swingable between a wearing position, as shown in FIGS. 1, 2 and 3 and a folded position, as shown in FIGS. 4, 5 and 6, and a nose engaging member 34 having a head portion attached to an inner side wall of the rear plate 33 and two divergent arms 341, 342 extending downwardly outwardly with curved outer side walls engaged with portions of the bottom walls of the lenses 1, 2 located in the wearing position.

Two temples 6, 7 having respective side bars 61, 71 of each of which the length is slightly shorter than half of the distance therebetween and swingable terminal sections 60, 70 designated to rest on the ears and grip the head of the wearer, are hingedly attached to outer portions of the lenses 1, 2 at hinges 62, 62. Furthermore, said side bars 61, 71 in conjunction with the folded terminal sections 60, 70 are swingable between a wearing position and a folded position behind the respective lenses 1, 2, as shown in FIG. 3.

Said terminal sections 60, 70 are hingedly attached to the respective far end portions of the side bars 61, 71 so as to be swingable between a wearing position and a folded position under the side bars 61, 71, as shown in FIG. 3.

A well portion is formed in a mid upper edge of each of the lenses 1, 2 wherein a substantially T-shaped projector is located on a mid portion of a flat bottom wall of the well portion defining a pair of spaced receptacles between the projector and side walls of the well portion.

The supporting bracket units 40, 50 comprises two sets of connecting bodies with one end of each of which interally formed on a mid upper inner wall of each of the covers 4 or 5. A pair of opposed recesses are provided for respectively receiving trunnions of the T-shaped projector in opposed inner side walls, and a pair of aligned grooves or notches 401 or 501 are transversely provided on either set of the connecting bodies. The supporting bracket units 40, 50 are mounted on the lenses 1, 2 by fitting the trunnions of the T-shaped projectors 11, 21 into the recesses so that the lens covers 4, 5 are swingable between the first horizontal position wherein the grooves or the notches 401, 501 of the connecting bodies are engaged with the bottom walls of the well portions of the lenses 1, 2, and the second dependent position.

A lock member is further provided for firmly maintaining the folding glasses in folded condition, as shown in FIGS. 1, 2 and 5, which comprises a pair of spaced posts 52, 53 integrally formed on an inner side wall of a lens and adapted to firmly receive a plug member 52 integrally formed on an inner side wall of the other lens as the lenses 1, 2 in conjunction with the covers are resided in the folded position.

In folding operation, as shown in FIGS. 3 and 4, firstly, the temples 6, 7 are swung into the folded position and the lens covers 4, 5 are swung into dependent position, then the lenses 1, 2 in conjunction with respective dependent covers 4, 5 are swung into the folded position in a shape similar to a beetle of the like, as shown in FIGS. 5 and 6.

The preferred embodiment of this invention resides in the following features:

(1) In normal usage, the lens covers 4, 5 are in the position shown in FIG. 2 wherein the covers extend horizontally outwardly of the respective lenses 1, 2 with the covers out of the line of vision of the wearer for shading glare light;

(2) In folded condition, the lenses 1, 2 are respectively under protection of the covers 4, 5 and the shape is decorative; and (3) The folding procedure is easy and simple in operation.

While the invention has been described with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims, which scope is to be accorded the broadest interpretation so as to encompass all such modifications and equivalent structure.

What is claimed is:

1. A folding glasses comprising:
    a head-engaging frame member having:
        a pair of spaced lenses;
        a bridge member having a frontal plate and a rear plate sandwiching inner portions of the lenses, and means for hingedly securing stacked portions of the frontal plate, the lenses and the rear plate, respectively, and a nose-engaging member having an engaging portion for resting on the wearer's nose, attached to an inner side wall of the rear plate;
        a pair of temples having a pair of side bars with one end of the either bar hingedly attached to an outer portion of an inner side wall of the lenses, and a pair of terminal sections hingedly attached to other ends of the side bar and swingable between a wearing position and a folded position under the respective side bars; and
    a pair of lens covers corresponding in shapes to the lenses, and hingedly mounted respectively on the lenses to be swung between a horizontal position and a dependent position via a connecting means.

2. A folding glasses as claimed in claim 1, wherein the connecting means comprises:
    a pair of well portions respectively provided in mid upper edges of the lenses and a pair of substantially T-shaped projectors having trunnions laterally located at upper portions thereof, provided on mid portions of flat bottoms of the well portions; and
    a pair of supporting bracket units having paired connecting bodies respectively formed on inner side walls of the lens covers respectively, having, respectively, opposed recesses for hingedly receiving the trunnions of the T-shaped projectors.

3. A folding glasses as claimed in claim 1, wherein the nose-engaging member comprises a head portion attached to an inner side wall of the rear plate of the bridge member and two lateral arms extending downwardly outwardly with respective curved outer side walls thereof engaged with portions of bottom walls of the lenses as located in a wearing position.

4. A folding glasses as claimed in claim 1, wherein the lens covers are evenly printed with a plurality of circular patterns on outer side walls.

* * * * *